United States Patent Office 3,072,972
Patented Jan. 15, 1963

---

3,072,972
METHOD FOR MAKING CELLULAR POLYPROPYLENE USING NITROGUANIDINE AS THE BLOWING AGENT
Kyohei Yokose, Mori, Motoyama-cho, Higashinada-ku, Kobe, Masao Watanabe, Ashiya-shi, and Iwao Yoshida, Kichijoin, Minami-ku, Kyoto, Japan, assignors to Sumitomo Electric Industries, Ltd., Konohana-ku, Osaka, Japan, a company of Japan
No Drawing. Filed Feb. 25, 1959, Ser. No. 795,347
9 Claims. (Cl. 18—59)

This invention relates to the preparing method of cellular polyolefine by heating and molding a mixture of polyolefine, such as polyethylene and polypropylene with a special ingredient making the same.

As is well known, polyethylene has excellent electrical and chemical properties. In recent times, it is demanded more and more as insulating material for communication wires and the insulated cable cores of communication cable. However, polyethylene has a greater dielectric constant than insulating material hitherto used for communication cable. In consequence, polyethylene-insulated communication cables have a drawback in that they have a greater electrostatic capacity and also that they have a larger overall diameter than paper-insulated communication cable of the conventional type.

An improvement in cellular polyethylene cables was made in the past by eliminating the said drawback of polyethylene cables and by making the electrostatic capacity of such cables nearly equal to that of paper-insulated cables. It cannot be denied that such cellular polyethylene cables resulted in an improvement in the electrical characteristics of cables. However, such cables have a disadvantage in that their mechanical strength is weakened, so that the thickness of insulation has to be increased and therefore the cost becomes higher.

In order to have more demands for cellular polyethylene cables, it is necessary to reduce their production cost. To attain this objective, it is necessary to reduce the thickness of the sheath is decreased, the mechanical strength will be weakened still further, and it will be an extremely difficult job to cover conductors with such polyethylene of a low mechanical strength at a high speed.

We tried to use, as insulating material for communication cables, polyolefine that has a higher melting point and a greater mechanical strength than polyethylene used in the past. For instance, polyethylene of the low pressure process and polypropylene were supposed to be good for our purpose. However, polyethylene of the low pressure process, for instance, has a melting point 30–40° C. higher than that of polyethylene of the conventional type, so that the foaming agents hitherto used generally cannot serve the purpose of foaming because their foaming temperature is too low.

One object of the present invention is to obtain cellular polyolefine that has a high melting temperature and great mechanical strength by expanding such polyolefine that has a high melting temperature.

Another object of this invention is to cover conductor with cellular polyolefine and to provide communication cables which have a small electrostatic capacity and which are inexpensive.

According to this invention, polyolefine and nitroguanidine are mixed together and the mixture is made cellular by heating and molding.

Cellular polyolefine of this invention is made, for instance, by heating and molding at a temperature in the neighborhood of 230° C. a mixture prepared by adding 0.5–5.0 parts of nitroguanidine to 100 parts of low pressure polyethylene. In the above method, the temperature employed is approximately the temperature at which the foaming action of nitroguanidine takes.

With such cellular polyolefine or cellular polyolefine covering layer, it is possible to obtain any desired foaming expansion from 10 to 60% by suitably selecting the quantity of nitroguanidine added and the temperature for extrusion.

Hereunder an example of cellular polyolefine wire of this invention will be explained. The cellular polyethylene-insulated conductor was made by extruding at 235° C. a mixture of 100 parts of low pressure polyethylene and 2.0 parts of nitroguanidine covering 0.5 mm. soft copper wire. The extruded core had an overall diameter of 0.9 mm. and had a foaming expansion of approximately 40%. At 1.0 kc., its dielectric constant was 1.6. Having electrostatic capacity almost equal to that of the paper-insulated communication cables of the conventional type, the cables in accordance with our invention were verified to be suitable for communication cables.

As explained above, the cellular polyolefine of this invention is excellent in heat-resisting property and in mechanical strength, so that it is suitable for use as insulating material for communication cables. Communication cables in which cellular polyolefine-insulated conductors are employed have electric characteristics equal to or better than those of the paper-insulated communication cables, and, furthermore, have an excellent moisture-resisting property and are inexpensive.

We claim:
1. A method of manufacturing cellular polyolefine, characterized in that polypropylene and nitroguanidine are mixed together, the mixture obtained is heated and molded and at the same time the said mixture is foamed.

2. A method of manufacturing cellular polyolefine described in claim 1, characterized in that 100 parts of polypropylene and 0.5–5.0 parts of nitroguanidine are mixed together, the mixture obtained is heated and molded at a temperature in the neighborhood of 230° C.

3. A method of manufacturing cellular polyolefine-insulated conductor, characterized in that polypropylene and nitroguanidine are mixed together, the mixture obtained is heated and extruded and at the same time foamed, the said mixture covering an electric conductor.

4. A method of manufacturing cellular polyolefine-insulated conductor described in claim 3, in which the mixture is prepared by adding 0.5–5.0 parts of nitroguanidine to 100 parts of polypropylene and the extruding is made at a temperature in the neighborhood of 230° C.

5. The method of making cellular polyolefine, consisting of the steps of mixing polypropylene and nitroguanidine, applying molding pressure to the mixture, and simultaneously applying heat in a sufficient quantity to foam the same.

6. The method of making cellular polyolefine consisting of the steps of mixing 100 parts of propylene with 0.5–5.0 parts of nitroguanidine, applying a molding pressure to the mixture, and simultaneously heating the same to approximately 230° C. to foam the same.

7. The method of insulating a conductor, consisting of the steps of mixing polypropylene and nitroguanidine, applying heat and pressure to the mixture to extrude the mixture over the conductor and simultaneously foam the same.

8. The method of insulating a conductor, consisting of the steps of mixing 100 parts of low pressure polypropylene and 0.5 to 5.0 parts of nitroguanidine, applying an extruding pressure at a temperature of 230° C. to extrude the mixture over the conductor and simultaneously foam the same.

9. The method of insulating a conductor of 0.5 mm. size consisting of the steps of mixing 100 parts of low pressure polypropylene and 2.0 parts of nitroguanidine, applying an extruding pressure at a temperature of 235° C. to extrude the mixture over the conductor and simultaneously foam the insulation to 0.9 mm.

References Cited in the file of this patent
UNITED STATES PATENTS

| | | |
|---|---|---|
| 2,261,459 | Cooper et al. | Nov. 4, 1941 |
| 2,532,243 | Ott | Nov. 28, 1950 |
| 2,849,028 | Clark et al. | Aug. 26, 1958 |
| 2,977,329 | Lecher et al. | Mar. 28, 1961 |